(12) United States Patent
Serrato

(10) Patent No.: US 9,965,603 B2
(45) Date of Patent: May 8, 2018

(54) IDENTITY ASSURANCE

(71) Applicant: Assa Abloy AB, Stockholm (SE)

(72) Inventor: Christy Serrato, Danville, CA (US)

(73) Assignee: Assa Abloy AB, Stockholm (SE)

( * ) Notice: Subject to any disclaimer, the term of this patent is extended or adjusted under 35 U.S.C. 154(b) by 63 days.

(21) Appl. No.: 14/832,034

(22) Filed: Aug. 21, 2015

(65) Prior Publication Data

US 2017/0053106 A1   Feb. 23, 2017

(51) Int. Cl.
*G06F 21/31* (2013.01)
*G06F 21/32* (2013.01)
*G06F 21/36* (2013.01)
*G07C 9/00* (2006.01)

(52) U.S. Cl.
CPC ............. *G06F 21/31* (2013.01); *G06F 21/32* (2013.01); *G06F 21/36* (2013.01); *G07C 9/00087* (2013.01); *G07C 9/00111* (2013.01); *G07C 9/00119* (2013.01); *G06F 2221/2149* (2013.01)

(58) Field of Classification Search
CPC .......... G06F 21/31; G06F 21/32; G06F 21/36; G06F 2221/2149; G07C 9/00087; G07C 9/00111; G07C 9/00119
See application file for complete search history.

(56) References Cited

U.S. PATENT DOCUMENTS

| 4,581,634 | A | 4/1986 | Williams | |
|---|---|---|---|---|
| 8,370,639 | B2 | 2/2013 | Azar et al. | |
| 8,487,976 | B2 | 7/2013 | Kenoyer | |
| 2003/0023874 | A1* | 1/2003 | Prokupets | G06F 21/32 726/4 |
| 2004/0243567 | A1* | 12/2004 | Levy | G06F 17/30032 |
| 2006/0274945 | A1* | 12/2006 | Chu | G06Q 50/10 382/190 |
| 2007/0013610 | A1 | 1/2007 | Mooney et al. | |
| 2007/0086626 | A1 | 4/2007 | Mariani et al. | |
| 2009/0116667 | A1* | 5/2009 | Lin | H03G 7/002 381/107 |
| 2010/0075631 | A1* | 3/2010 | Black | H04M 1/05 455/410 |
| 2010/0115573 | A1* | 5/2010 | Srinivasan | H04N 7/163 725/131 |

(Continued)

*Primary Examiner* — Kambiz Zand
*Assistant Examiner* — Tongoc Tran
(74) *Attorney, Agent, or Firm* — Muirhead and Saturnelli, LLC

(57) ABSTRACT

Confirming access for a user includes capturing an image of the user, capturing information on an identity badge worn by the user, and denying access to a resource in response to the information being inconsistent with the image. Confirming access for a user may also include denying access in response to the information being inconsistent additional information about the user stored in a database. The information may include a picture of the user. The resource may include access to an area. The resource may include access to a computer. Confirming access for a user may also include, following allowing access to the computer, periodically recapturing the image of the user and recapturing the information on the identity badge and denying access to the computer in response to the information being inconsistent with the image. The information may include a visual code that identifies the user.

20 Claims, 6 Drawing Sheets

(56) References Cited

U.S. PATENT DOCUMENTS

| | | | |
|---|---|---|---|
| 2011/0221568 A1* | 9/2011 | Giobbi | G06F 19/322 340/5.82 |
| 2012/0233615 A1* | 9/2012 | Barrus | G06F 21/6218 718/100 |
| 2013/0218931 A1* | 8/2013 | Lewis | G06F 17/30289 707/803 |
| 2013/0308772 A1* | 11/2013 | Rodriguez Marchant | H04L 9/28 380/28 |
| 2014/0043141 A1* | 2/2014 | Cazanas | G06F 21/35 340/5.81 |
| 2014/0173289 A1* | 6/2014 | Casilli | H04L 12/282 713/185 |
| 2014/0266590 A1 | 9/2014 | Guillaud | |
| 2014/0280299 A1* | 9/2014 | Crook | G06F 17/30864 707/769 |
| 2014/0280354 A1* | 9/2014 | Giuffrida | G06F 17/3028 707/796 |
| 2014/0304787 A1* | 10/2014 | Kurien | G06Q 10/1053 726/6 |
| 2014/0333412 A1* | 11/2014 | Lewis | G07C 9/00031 340/5.2 |
| 2015/0034717 A1* | 2/2015 | Adelson | G06F 21/36 235/382 |
| 2015/0035643 A1* | 2/2015 | Kursun | G07C 9/00158 340/5.52 |
| 2015/0161461 A1* | 6/2015 | McNulty | G06K 9/00073 382/116 |
| 2015/0358400 A1* | 12/2015 | Bartlett, II | H04L 63/126 709/201 |
| 2016/0004868 A1* | 1/2016 | Robke | G06F 21/577 726/25 |
| 2016/0012218 A1* | 1/2016 | Perna | G06K 9/0061 726/18 |
| 2016/0147987 A1* | 5/2016 | Jang | G06F 21/32 726/19 |
| 2016/0203304 A1* | 7/2016 | Bielstein | G06F 3/048 715/741 |
| 2017/0046346 A1* | 2/2017 | Zhou | G06F 17/3053 |

* cited by examiner

IDENTITY ASSURANCE

TECHNICAL FIELD

This application is related to the field of security and more particularly to the field of verifying identity of a user having an identity badge.

BACKGROUND OF THE INVENTION

Users sometimes share their credentials with other users even when there is a prohibition against doing so. For example, a company may issue a badge to a first user to allow access to particular resources. The first user may then lend the badge to a second user who does not otherwise have access to those resources. In some cases, the sharing/loaning of credentials is relatively innocuous. For example, a worker who is otherwise unauthorized may obtain direct access to files/data to facilitate performance of his or her work duties. In such situations, sharing/loaning credentials may be seen as "cutting through red tape" and may be deemed relatively harmless by the participants. However, in other cases, the reason for using another's credentials may be more nefarious. For instance, an absent worker may have a coworker use the absent worker's badge or ID card to fraudulently record that the absent worker was at work.

Irrespective of the motivation for improperly using credentials of another, the result is almost always a breach in security since, by definition, the person that is using another's credentials is probably not authorized to do whatever they are doing with the wrong credentials. In some instances, co-workers may inhibit loaning credentials by, for example, visually confirming that a photograph on an identity badge matches a face of a person wearing the badge. However, in other cases, security badges are used for automated systems that, for example, open a door to grant access to a restricted area or allow the holder to access a restricted computer. In many of these cases, there may not be an opportunity for anyone to verify that the user is using his or her own credentials.

Accordingly, it would be desirable to automate security functions to inhibit a user from using a security badge or similar credentials of another user.

SUMMARY OF THE INVENTION

According to the system described herein, confirming access for a user includes capturing an image of the user, capturing information on an identity badge worn by the user, and denying access to a resource in response to the information being inconsistent with the image. Confirming access for a user may also include denying access in response to the information being inconsistent with additional information about the user stored in a database. The information may include a picture of the user, multiple pictures of the user and/or photographs taken previously at authentication devices during previous authentication requests. The resource may include access to an area. The resource may include access to a computer. Confirming access for a user may also include, following allowing access to the computer, periodically recapturing the image of the user and recapturing the information on the identity badge and denying access to the computer in response to the information being inconsistent with the image. The information may include a visual code that identifies the user and/or a visual code that identifies authentication status of the user. Information corresponding to the visual code may be compared with additional information about the user stored in a database.

According further to the system described herein, modifying an identity badge of a user includes determining a location of the user, displaying a symbol/icon on the identity badge in response to the using being in a special area, and displaying a picture of the user on the identity badge in response to the user not being in a special area. An area may be designated as special based on gender of other users in the area.

According further to the system described herein, a non-transitory computer-readable medium contains software that confirms access for a user. The software includes executable code that captures an image of the user, executable code that captures information on an identity badge worn by the user, and executable code that denies access to a resource in response to the information being inconsistent with the image. The software may also include executable code that denies access in response to the information being inconsistent additional information about the user stored in a database. The information may include a picture of the user, multiple pictures of the user and/or photographs taken previously at authentication devices during previous authentication requests. The resource may include access to an area. The resource may include access to a computer. The software may also include executable code that periodically recaptures the image of the user and recaptures the information on the identity badge and denies access to the computer in response to the information being inconsistent with the image and following allowing access to the computer. The information may include a visual code that identifies the user and/or a visual code that identifies authentication status of the user. Information corresponding to the visual code may be compared with additional information about the user stored in a database.

According further to the system described herein, a non-transitory computer-readable medium contains software that modifies an identity badge of a user. The software includes executable code that determines a location of the user, executable code that displays a symbol/icon on the identity badge in response to the using being in a special area, and executable code that displays a picture of the user on the identity badge in response to the user not being in a special area. An area may be designated as special based on gender of other users in the area.

According further to the system described herein, controlling access to a computer includes using a camera to visually capture security information corresponding an image of the user and/or information on an identity badge worn by the user, allowing access to the computer based on the security information, and locking out access to the computer in response to the user leaving the computer.

BRIEF DESCRIPTION OF THE DRAWINGS

Embodiments of the system are described with reference to the several figures of the drawings, briefly described as follows.

DETAILED DESCRIPTION OF VARIOUS EMBODIMENTS

Figure 1:
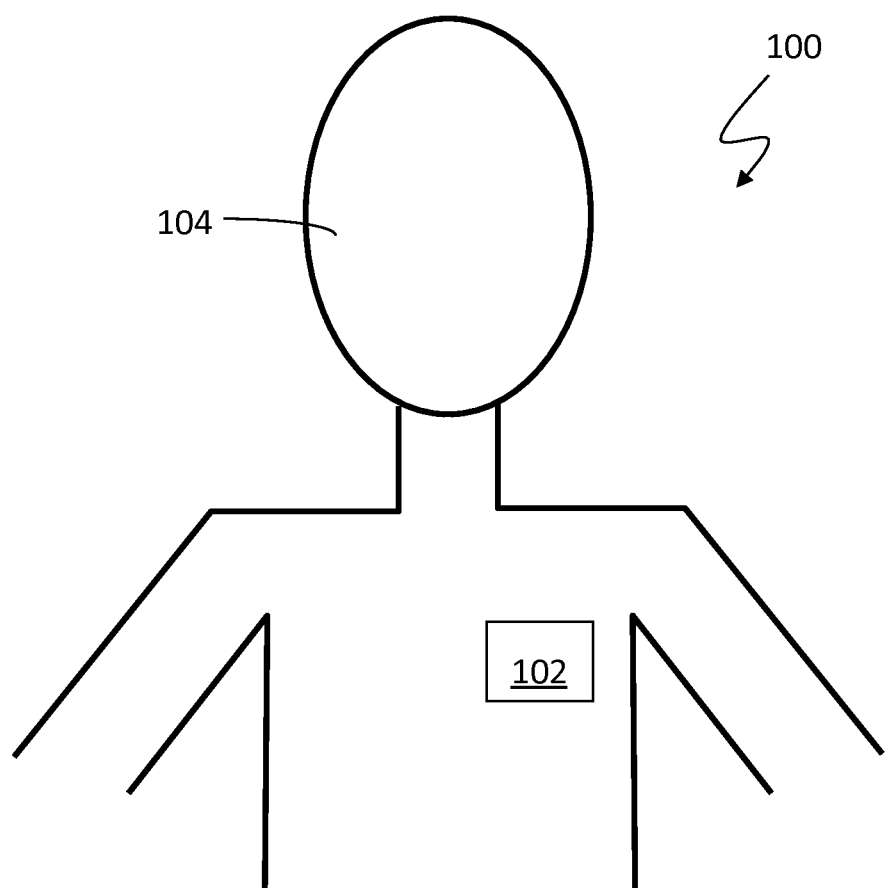
FIG. 1 is a diagram showing a user with an identity badge according to an embodiment of the system described herein.

Referring to FIG. 1, is a user 100 is wearing an identity badge 102 that provides the user 100 with access to specific resources. For example, the identity badge 102 may allow the user to enter restricted areas in a company, such as restricted rooms in a bank, and/or allow the user 102 to access restricted computers or to log on to restricted company accounts. In some cases, the user 102 may present the identity badge 102 to a reader that is connected to a central database containing credentials of the user indicating resource(s) to which the user 100 has access as well as possibly allowable types/levels of access the user 100 may have to those resources. In other instances, the user 100 may present the identity badge 102 to a security guard (or similar) that may subsequently look up the user 100 in a database and/or present the identity badge 102 to a reader controlled by the security guard.

The identity badge 102 may optional include a visual image of the user 100 that may be designed to match a face 104 of the user 100, such as a photograph of the user. However, if the user 100 uses a reader or other automated system to gain whatever access is provided by the identity badge 102, then it is possible that the face 104 of the user 100 does not necessarily match the visual image on the identity badge 102. However, the system described herein ensures that the face 104 of the user 100 matches the visual image, even when the user 100 uses an automated system to gain access to resource(s).

Figure 2A:
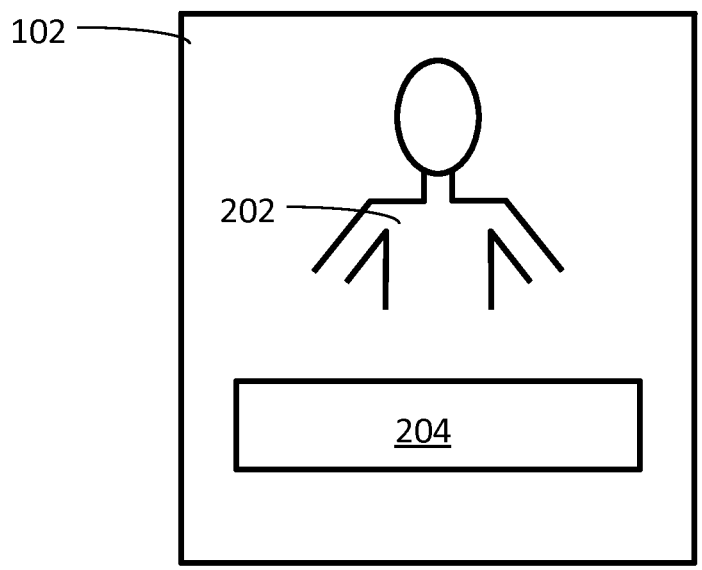
FIGS. 2A and 2B are diagrams showing different configurations of an identity badge according to embodiments of the system described herein.

Referring to FIG. 2A, a first embodiment of the identity badge 102 is shown as including a visual image 202 of the user (photograph of the user) and a visual code 204, such as a bar code. The visual image 202 is designed to match a face of a holder of the identity badge 102. In some embodiments, a user joins an organization that issues the identity badge 102 and takes a photograph of the user and then causes the resulting image to be permanently affixed to the identity badge 102. In other embodiments, described elsewhere herein, the image 202 corresponding to a photograph of the user may be transmitted to the identity badge 102 (i.e., electronically) and may be modifiable while the user is wearing the identity badge 102. The visual code 204 may be used to uniquely identify the user, the identity badge 102, authentication status of the user, or some combination thereof. In some embodiments, each badge holder may be issued a unique number (e.g., employee number) that may be encoded and displayed in an appropriate format (e.g., a bar code or a QR code) as the visual code 204 on the identity badge 102.

Figure 2B:
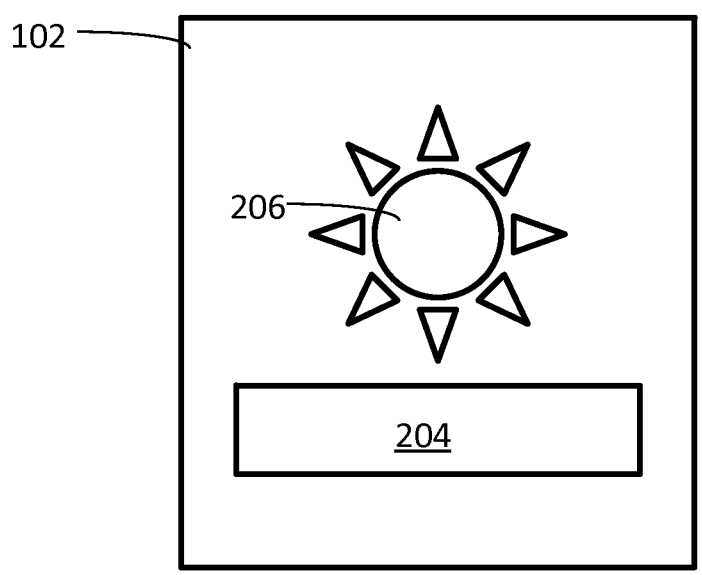

Referring to FIG. 2B, another embodiment of the identity badge 102 shows a symbol/icon 206 on the identity badge 102 instead of a visual image corresponding to a face of the badge holder. A particular format of the symbol/icon 206 may have some significance. For example, the symbol/icon 206 may represent a rank in an organization, a department or group in an organization, etc. Alternatively, the particular format of the symbol/icon 206 may be insignificant and, in some cases, members of an organization that issues the identity badge 102 may be assigned one of a fixed number of possible symbols/icons or each member may be assigned a unique symbol/icon. In some embodiments, the symbol/icon 206 may be permanently affixed to the identity badge 102 while in other embodiments the symbol/icon 206 may be transmitted to the identity badge 102 and may be modifiable while the user is wearing the identity badge 102. In some embodiments the symbol may be selected so that all users authorized to be present in an area display the same symbol, which changes from time to time and which may be randomly selected. In some embodiments, described elsewhere herein, the identity badge 102 may display either the image 202 or the symbol/icon 206, either of which may be transmitted to the identity badge 102.

In some embodiments, the picture of FIG. 2A or the symbol/icon 206 of FIG. 2B may be permanently affixed to the identity badge 102 while different values for the bar code 204 may be transmitted to the identity badge 102 and may be modifiable while the user is wearing the identity badge 102. Alternatively, the bar code 204 may be replaced altogether with a symbol/icon in the identity badge 102 shown in FIG. 2A or with a picture in the identity badge 102 of FIG. 2B. It is also possible to have multiple pictures, multiple symbols/icons, and/or multiple bar codes on the identity badge 102 and, generally, any combination of static and dynamic pictures, symbols/icons, and/or bar codes on the identity badge 102.

Figure 3A:
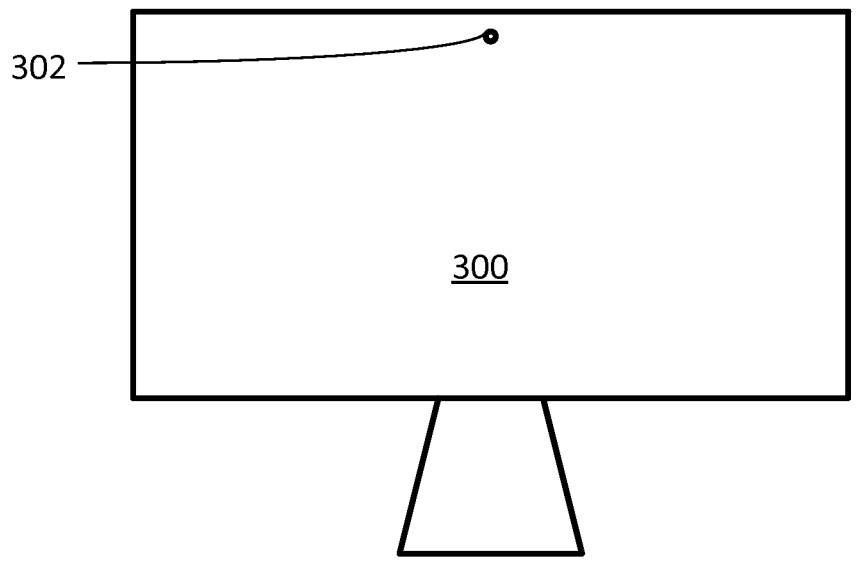
FIGS. 3A and 3B are diagrams showing different configurations of computers according to embodiments of the system described herein.

Referring to FIG. 3A, a personal computer 300 is shown with a built-in camera 302. In an embodiment herein, the built-in camera 302 periodically or continuously obtains an electronic image of a user of the personal computer 300 as well as an electronic image of an identity badge used by the user, such as the identity badge 102, described elsewhere herein. If the identity badge of the user includes a visual image of the user (photograph of the user), then the personal computer 300, or possibly another system coupled thereto, may use facial recognition processing to match the visual image on the identity badge to the face of the user. In other instances, the personal computer 300, or possibly another system coupled thereto, uses a database to first match a symbol/icon and/or a visual code to a stored image of a particular user and then compares the stored image to the expected image for the user of the computer 300.

In an embodiment herein, a user desiring access to the computer 300 faces the camera 302 so that the camera 302 has a view of the face of the user and of any identity badge being worn by the user. The camera 302 electronically captures the information which is transmitted to the database/processing (not shown in FIG. 3A) that determines whether to allow access to the computer 300.

Figure 3B:
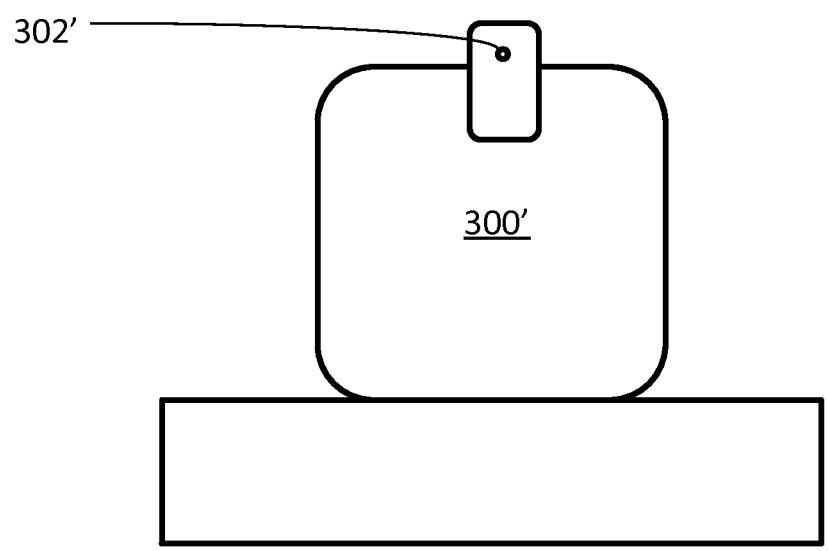

Referring to FIG. 3B, a personal computer 300' is shown that does not have a built-in camera. In the embodiment of FIG. 3, an add-on camera 302' is used. The add-on camera 302' may be coupled to the personal computer 300' using any appropriate mechanism, such as attaching the add-on camera 302' to a display of the personal computer 300'. In other instances, the add-on camera 302' may be physically separate, but near, the personal computer 300'. In some embodiments, the add-on camera 302' may be supplied by the user, for example, a smart phone of the user. The add-on camera 302' may communicate with the personal computer 300' using a USB connection, a Bluetooth connection, or any other type of data connection capable of transmitting data between the add-on camera 302' and the personal computer 300'. In other respects, the combination of the personal computer 300' and the add-on camera 302' may work like the personal computer 300 and the built-in camera 302, described above. In an embodiment herein, a user desiring access to the computer 300' faces the add-on camera 302' or uses a hand-held camera, personal cell phone, etc. to provide a view of the face of the user and of any identity badge being worn by the user. The camera 302' electronically captures the information which is transmitted to the database/processing (not shown in FIG. 3B) that determines whether to allow access to the computer 300'.

In some instances, the user may be periodically and continuously verified to prevent a first user from initially logging in and then a second user taking over. In some cases, periodic and continuous verification may be used to terminate user access to a resource if access privileges for the user have been revoked following initial authentication. Screen saver mode may be coordinated with verification of the user. When the user leaves the presence of the computer, the screen saver/dimming may be immediately invoked, to lock out access to the computer and prevent a different user from approaching and gaining access to information if the user fails to otherwise secure access to the computer.

Figure 4:
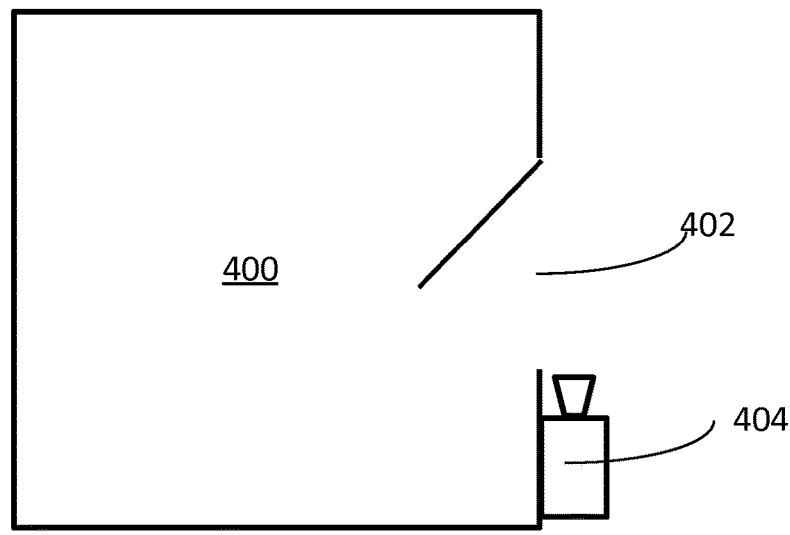
FIG. 4 is a diagram showing a restricted area and a camera according to an embodiment of the system described herein.

Referring to FIG. 4, a restricted access area 400 includes a door 402 that controls access to the area 400. The restricted access area 400 may be any area where it is desirable to allow entrance to only certain members of a group/organization. For example, the restricted area 400 may be a room or group of rooms in a bank, where only employees of the bank or possibly only certain employees of the bank are allowed access.

A camera 404 is positioned near the door and facilitates controlling access to the area 400. As described in more detail elsewhere herein, the camera 404 may be coupled to a database/processing (not shown in FIG. 4) that may actuate the door 402 so that the door 402 is opened for users that are allowed access to the area 400 and the door 402 is not opened for users that are not allowed access. In an embodiment herein, a user desiring access to the area 400 faces the camera 404 so that the camera 404 has a view of the face of the user and of any identity badge being worn by the user. The camera 404 electronically captures the information which is transmitted to the database/processing (not shown in FIG. 4) that determines whether to actuate the door 402 to allow entrance to the user.

Figure 5A:
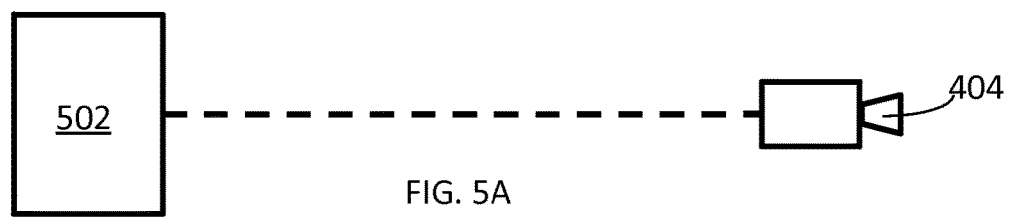
FIGS. 5A and 5B are diagrams showing different configurations of coupling a camera to a database/processing device according to embodiments of the system described herein.

Referring to FIG. 5A, the camera 404 is shown as being connected to a database/processing device 502. The database/processing device 502 may be a conventional server/workstation running any appropriate operating system and having additional software capable of providing the security functionality described herein. Security software that runs on one or more commercially available computer operating systems is provided by a number of vendors, including iCLASS SE® Platform provided by HID Global Corporation. The camera 404 may be connected to the database/processing device 502 using any appropriate connection mechanism, such an Ethernet connection, a protected hardened data line, a telephone connection, etc.

Figure 5B:
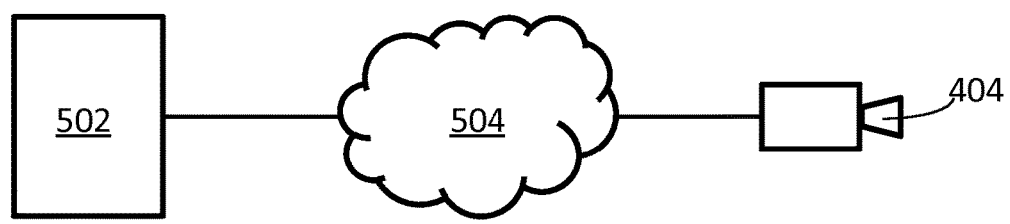

Referring to FIG. 5B, the camera 404 is shown as being connected to the database/processing device 502 via a network 504, such as the Internet. Note that the network 504 may be almost any type of network capable of providing appropriate data transfer between the camera 404 and the database/processing device 502, including a private network that is not generally accessible to the public or possibly the Internet. In some embodiments, data may be encrypted prior to being transferred between the camera 404 and the database/processing device 502. Note also that, in some embodiments, the functionality of the database/processing device 502 may be performed by multiple components which may or may not be distributed to different locations and/or logically distributed/separated.

Figure 6:
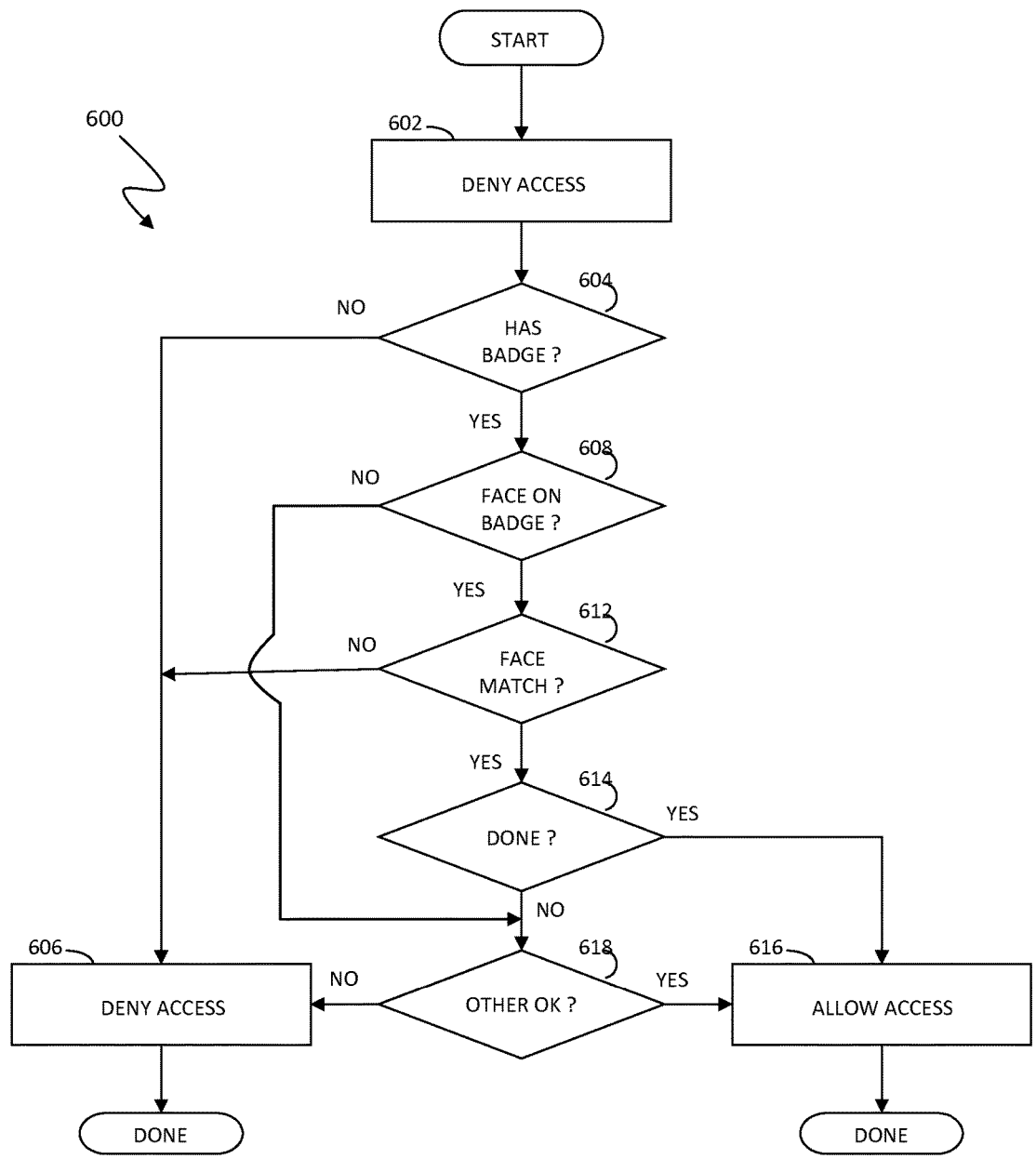
FIG. 6 is a flow diagram illustrating determining whether to allow or deny access according to an embodiment of the system described herein.

Referring to FIG. 6, a flow diagram 600 illustrates processing by the database/processing device 502. Processing begins at a first step 602 where the database/processing device 502 receives image data from a camera, such as the camera 404, discussed above, or one of the cameras 302, 302', also discussed above. The image data may be an electronic image of a user requesting access to a resource, such as the area 400 or one of the computers 300, 300'. Following the step 602 is a test step 604 where it is determined if the user is wearing an identity badge, such as the identity badge 102. In an embodiment herein, a user that is not wearing an identity badge is automatically denied access. Thus, if it is determined at the test step 604 that the user is not wearing an identity badge, control transfers from the test step 604 to a step 606 where access to the desired resource is denied. For example, if the desired resource is the area 400, access is denied at the step 606 by causing the door 402 to remain closed. Following the step 606, processing is complete.

If it is determined at the test step 604 that the user is wearing an identity badge, then control transfers from the test step 604 to a test step 608 where it is determined if the identity badge includes a face thereon. As discussed elsewhere herein, in some instances, an identity badge may not include a face of the badge holder. For example, the identity badge may include a symbol/icon instead. If it is determined at the test step 608 that the identity badge includes a face, then control transfers from the test step 608 to a test step 612 where it is determined if the visual image of a face (photograph) on the identity badge matches the face of the user wearing the badge. Matching the face (photograph) may mean matching a stored facial image (502), and/or matching the actual image taken by camera 404. The determination at the step 612 may be performed by conventional facial recognition software. If it is determined at the test step 612 that the visual image of the face on the identity badge does not match the face of the user wearing the badge, then control transfers from the test step 612 to the step 606, discussed above, where access is denied. Following the step 606, processing is complete.

If it is determined at the test step 612 that the visual image of the face on the identity badge does match the face of the user wearing the badge, then control transfers from the test step 612 to a test step 614 where it is determined if all security checking is complete. In some embodiments, the only checking that is performed using the camera, etc. is to confirm that the visual image of the face on the identity badge matches the face of the user wearing the badge because additional (possibly conventional) checking is to be performed by other systems, such as a card reader. If it is determined at the step 614 that the system is only checking if the visual image of a face on the identity badge matches the face of the user wearing the badge, then control transfers from the test step 614 to a step 616, where access is allowed. For example, if the desired resource is the area 400, access is allowed at the step 616 by causing the door 402 to open. Following the step 616, processing is complete.

If it is determined at the step 614 that all security checking is not complete (i.e., there is security checking to be performed in addition to matching a face of a user with an image on an identity badge), then control transfers from the test step 614 to a test step 618, where other security checking may be performed. Note that the step 618 is reached directly from the step 608, discussed above, if the system did not attempt to match the face of the user with a visual image on an identity badge of the user (e.g., because the identity badge does not include a visual image of the face of the user). Determinations at the test step 618 include whether the face of the user at the camera matches a stored image of the face of the user where identity of the user may be determined based on the visual code 204 on the identity badge. Other determinations at the step 618 may include whether the user has an appropriate symbol/icon 206 on the identity badge used by the user, whether the user is generally authorized for the requested access, whether the identity badge has expired, etc. Another possible test at the step 618 may include whether the user is in a restricted area that the user is not authorized to be in, such as a male being in an area designated for females only (discussed elsewhere herein). Note that it is possible to perform one or more than one other security check at the step 618. If it is determined at the step 618 that the user passes the one or more other security checks, then control transfers from the test step 618 to the step 616, discussed above, where access is allowed. Otherwise, control transfers from the step 618 to the step 606, discussed above, where access is denied. Following either the step 606 or the step 616, processing is complete.

Figure 7:
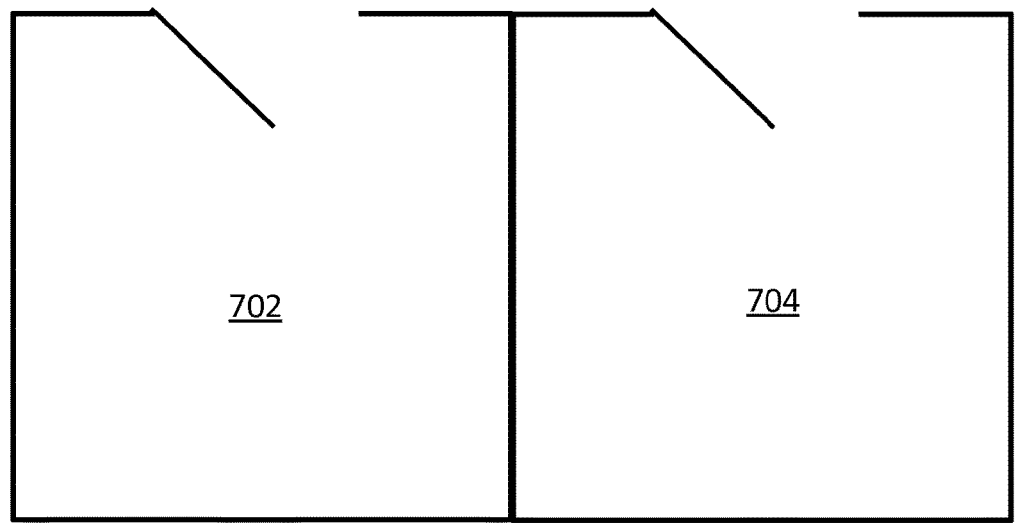
FIG. 7 is a diagram showing different restricted areas according to an embodiment of the system described herein.

Referring to FIG. 7, a diagram 700 illustrates a first area 702 and a second area 704. In one of the areas 702, 704, it may be appropriate for an identity badge to display a photograph of the user while in an other of the areas 702, 704, it may not. For instance, in some cultures, it is not appropriate to display a photograph of a woman to a man. In such a case, an identity badge of a woman may display a symbol/icon when the woman is in an area that includes men but may display a photograph of the woman when the woman is in an area in which men are excluded (by access policy) or at are not physically not present. For example, if the area 702 is an area in which only women are allowed and the area 704 is an area which allows both men and women, then a woman may have an identity badge that shows a photograph of the woman when she is in the area 702 but may show a symbol/icon when the woman is in the area 704. In some embodiments, while a woman is present in the 704 that allows both men and women and only women are present, a photo of the women may be displayed, but when a man enters the area 704, the photos of all women in the room instantly switch over to a symbol/icon.

Figure 8:
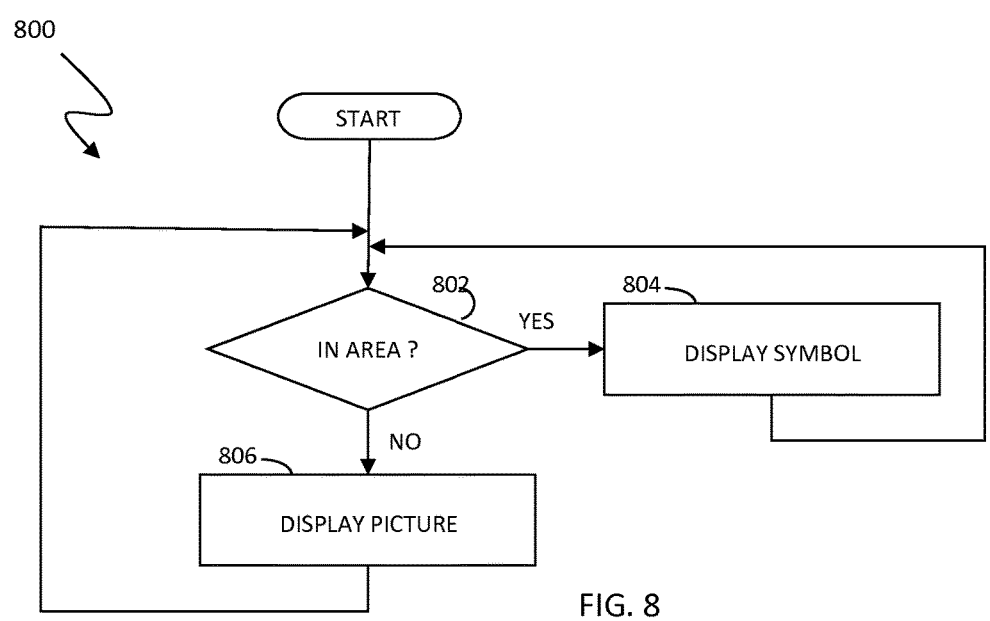
FIG. 8 is a flow diagram illustrating determining whether to allow or deny access according to an embodiment of the system described herein.

Referring to FIG. 8, a flow diagram 800 illustrates processing performed in connection with modifying an identity badge in response to location of a holder of the badge. Processing begins at a first test step 802 where it is determined if the holder/user is in a special area where a photograph of the holder is not to be displayed. Determination at the step 802 may be provided using, for example, conventional GPS technology. It is also possible to ascertain a location of a user by, for example, determining if the user entered a particular area (e.g., according to cameras, etc. used by the system described herein and/or from information recorded in readers as the user enters and exits different doors). If it is determined at the step 802 that the user is located in a special area, then control transfers from the step 802 to a step 804 where the identity badge of the user is caused to display a symbol/icon by, for example, transmitting an appropriate signal to the identity badge. Following the step 804, control transfers back to the step 802 for another iteration. If it is determined at the step 802 that the user is not located in a special area, then control transfers from the step 802 to a step 806 where the identity badge of the user is caused to display a photograph of the user by, for example, transmitting an appropriate signal to the identity badge. Following the step 806, control transfers back to the step 802 for another iteration.

Note that, in some cases, designation of an area as special or not may depend upon other users in the area. In such a case, the determination at the step 802 may include initially determining the other users in the area prior to designating the area as special. For example, a room may be designated as female only based on whether any males are present or not. Thus, the determination at the step may track the gender of all users in the room (based, for example, on company records, analysis of the photographs/faces, etc.) and, according to that assessment, decide whether the room should be designated as special. An identity badge of a woman entering such a room may display a photograph or a symbol/icon depending on whether any men are present in the room. In some cases, if an identity badge of a woman is displaying a photograph of the woman and a man enters the area, the photograph may be transformed into a symbol/icon.

Various embodiments discussed herein may be combined with each other in appropriate combinations in connection with the system described herein. Additionally, in some instances, the order of steps in the flow charts, flow diagrams and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with other computers and/or with a user. Software implementations of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:
1. A method of confirming access for a wearer of an identity badge at a location, comprising:
   capturing an image of the wearer;
   capturing a visual image of an authorized user of the identity badge provided on a surface of the identity badge according to information stored in the identity badge;

displaying a symbol/icon on a surface of the identity badge in response to the location being a special area in which an image of the authorized user is not to be displayed; and denying access to a resource in response to one of: the visual image of the authorized user being inconsistent with the image of the wearer or the location being the special area and the symbol/icon not being displayed on the identity badge.

2. A method, according to claim 1, further comprising:
denying access in response to the information being inconsistent with additional information about the user stored in a database.

3. A method, according to claim 2, wherein the information includes at least one of: a picture of the user, multiple pictures of the user and photographs taken previously at authentication devices during previous authentication requests.

4. A method, according to claim 1, wherein the resource includes access to an area.

5. A method, according to claim 1, wherein the resource includes access to a computer.

6. A method, according to claim 5, further comprising:
following allowing access to the computer, periodically recapturing the image of the wearer and recapturing the visual image of the authorized user of the identity badge provided on the surface of the identity badge and denying access to the computer in response to the visual image of the authorized user being inconsistent with the image of the wearer.

7. A method, according to claim 1, wherein the information includes at least one of: a visual code that identifies the user and a visual code that identifies authentication status of the user.

8. A method, according to claim 7, wherein information corresponding to the visual code is compared with additional information about the user stored in a database.

9. A method of modifying an identity badge of a user, comprising:
determining whether a location of the user is in a special area in which a picture of the user is not permitted to be displayed;
displaying a symbol/icon on the identity badge worn by the user in response to determining that the location of the user is in the special area; and
displaying a picture of the user on the identity badge worn by the user in response to determining that the location of the user is not in the special area.

10. A method, according to claim 9, wherein an area is designated as special based on gender of other users in the area.

11. A non-transitory computer-readable medium containing software that confirms access for a wearer of an identity badge at a location, the software comprising:
executable code that captures an image of the wearer;
executable code that captures a visual image of an authorized user of the identity badge provided on a surface of the identity badge according to information stored in the identity badge;
executable code that displays a symbol/icon on a surface of the identity badge in response to the location being a special area in which an image of the authorized user is not to be displayed; and executable code that denies access to a resource in response to one of: the visual image of the authorized user being inconsistent with the image of the wearer or the location being the special area and the symbol/icon not being displayed on the identity badge.

12. A non-transitory computer-readable medium, according to claim 11, the software further comprising:
executable code that denies access in response to the information being inconsistent with additional information about the user stored in a database.

13. A non-transitory computer-readable medium, according to claim 12, wherein the information includes at least one of: a picture of the user, multiple pictures of the user and photographs taken previously at authentication devices during previous authentication requests.

14. A non-transitory computer-readable medium, according to claim 11, wherein the resource includes access to an area.

15. A non-transitory computer-readable medium, according to claim 11, wherein the resource includes access to a computer.

16. A non-transitory computer-readable medium, according to claim 15, the software further comprising:
executable code that periodically recaptures the image of the wearer and recaptures the visual image of the authorized user of the identity badge provided on the surface of the identity badge and denies access to the computer in response to the visual image of the authorized user being inconsistent with the image of the wearer and following allowing access to the computer.

17. A non-transitory computer-readable medium, according to claim 11, wherein the information includes at least one of: a visual code that identifies the user and a visual code that identifies authentication status of the user.

18. A non-transitory computer-readable medium containing software that modifies an identity badge of a user, the software comprising:
executable code that determines whether a location of the user is in a special area in which a picture of the user is not permitted to be displayed;
executable code that displays a symbol/icon on the identity badge worn by the user in response to determining that the location of the user is in the special area; and
executable code that displays a picture of the user on the identity badge worn by the user in response to determining that the location of the user is not in the special area.

19. A non-transitory computer-readable medium, according to claim 18, wherein an area is designated as special based on gender of other users in the area.

20. A method of controlling access to a computer at a location, comprising:
using a camera to visually capture security information corresponding to: an image of the user and an image displayed on an identity badge worn by the user, wherein the image is based on information stored in the identity badge and wherein the image is a symbol/icon in response to the location being a special area in which an image of the authorized user is not to be displayed;
allowing access to the computer based on the security information; and
locking out access to the computer in response to the user leaving the computer.

* * * * *